United States Patent
Christoffersson et al.

(10) Patent No.: US 8,442,068 B2
(45) Date of Patent: May 14, 2013

(54) APPARATUS FOR REDUCED MODE TRANSMISSION OF DPCCH SIGNALING AND METHOD THEREOF

(75) Inventors: Jan Christoffersson, Lulea (SE); Hans Hannu, Lulea (SE); Min Wang, Lulea (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 288 days.

(21) Appl. No.: 13/120,478

(22) PCT Filed: Sep. 24, 2008

(86) PCT No.: PCT/SE2008/051064
§ 371 (c)(1),
(2), (4) Date: Mar. 23, 2011

(87) PCT Pub. No.: WO2010/036155
PCT Pub. Date: Apr. 1, 2010

(65) Prior Publication Data
US 2011/0188513 A1    Aug. 4, 2011

(51) Int. Cl.
*H04J 3/16* (2006.01)
(52) U.S. Cl.
USPC .......................................... 370/465; 370/252
(58) Field of Classification Search .................. 370/465, 370/252
See application file for complete search history.

(56) References Cited

U.S. PATENT DOCUMENTS

| 7,936,741 | B2 | 5/2011 | Vimpari et al. |
| 2002/0011643 | A1* | 1/2002 | Fermy et al. ................ 257/506 |
| 2006/0040696 | A1* | 2/2006 | Lin ............................. 455/522 |
| 2007/0173279 | A1* | 7/2007 | Kuroda et al. ................ 455/522 |
| 2007/0274276 | A1* | 11/2007 | Laroia et al. .................. 370/338 |
| 2008/0031193 | A1* | 2/2008 | Laroia et al. .................. 370/331 |
| 2008/0261530 | A1* | 10/2008 | Gerstenberger et al. ..... 455/63.1 |

FOREIGN PATENT DOCUMENTS

| JP | 2003249885 A | 9/2003 |
| JP | 2009504053 A | 1/2009 |
| WO | 2006/127340 A2 | 11/2006 |
| WO | 2007017733 A2 | 2/2007 |
| WO | 2007/053106 A1 | 5/2007 |

OTHER PUBLICATIONS

3rd Generation Partnership Project. "Uplink DPCCH and HS-SCCH Gating, General Description." 3GPP TSG-RAN Wg1 Meeting #46, R1-062395, Tallinn, Estonia, Aug. 28-Sep. 1, 2006.
Fresan, O. et al. "DPCCH Gating Gain for Voice over IP on HSUPA." IEEE Wireless Communications and Networking Conference, Kowloon, Hong Kong, Mar. 11-15, 2007.

* cited by examiner

*Primary Examiner* — Brian D Nguyen
(74) *Attorney, Agent, or Firm* — Coats & Bennett, P.L.L.C.

(57) ABSTRACT

A telecommunication apparatus (100) enabled for high-speed packet access is disclosed. The apparatus (100) is arranged to operate according to a reduced and a further reduced mode of transmission of dedicated physical control channel transmission, and has an operation mode controller (102). The operation mode controller (102) is arranged to determine a number of present consecutive dedicated physical data channel transmissions, and if the number of present consecutive dedicated physical data channel transmissions reaches a threshold, set the operation mode to the reduced mode, or if the number of present consecutive dedicated physical data channel transmissions is below the threshold, set the operation mode to the further reduced mode. Corresponding method and computer program are also disclosed.

15 Claims, 2 Drawing Sheets

APPARATUS FOR REDUCED MODE TRANSMISSION OF DPCCH SIGNALING AND METHOD THEREOF

TECHNICAL FIELD

The present invention relates to a telecommunication apparatus enabled for high-speed packet access, the apparatus being arranged to operate according to a reduced and a further reduced mode of transmission of dedicated physical control channel transmission. The invention further relates to a method and computer program for the telecommunication apparatus.

BACKGROUND

High-speed packet access features, like in Universal Mobile Telecommunication System (UMTS), provide for continuous connectivity. An approach for achieving this is User Equipment (UE) Discontinuous Transmission (DTX), which often is referred to as Uplink (UL) Dedicated Physical Control Channel (DPCCH) gating. With UL DPCCH gating, the power control signalling is sent only periodically (gated) to achieve a reduced mode of DPCCH transmissions. This can be made based on whether the UE have any data to send or not.

WO 2006/050443 A1 discloses an approach for selecting a 'normal activity mode' or a 'reduced activity mode', where the 'normal activity mode' means sending DPCCH transmissions in each slot, and 'reduced activity mode' means sending DPCCH transmissions, with full power, using e.g. only every fourth slot. The reduced activity mode can reduce interference up to a reduction corresponding to a 6 dB signal-to-interference target reduction. If the UE has not had any data to send for a certain time period, it switches to the reduced activity mode.

The gating scheme can have two different cycles with different cycle length, i.e. a reduced mode and a further reduced mode. For example, UMTS specifies having two such reduced modes. In the given example, after a data transmission on a Dedicated Physical Data Channel (DPDCH), the UE, which may have been in the further reduced operation mode, enters the reduced operation mode, i.e. the cycles between DPCCH transmissions are set to the shorter interval. After some time, preferably set by some timer or after a certain number of DPCCH transmissions, the UE returns to the further reduced operation mode, i.e. the cycles between DPCCH transmissions are set to the longer interval. The UE is kept in this further reduced operation mode until another DPDCH transmission occurs, and the similar process is repeated.

Typically, the further reduced operation mode is configured to have much less intense DPCCH activity. In this operation mode, it is also possible to use a longer preamble than what is available in the other reduced operation mode. This long preamble is supposed to be sufficient to allow power control to adjust before any DPDCH transmission. In case of the shorter interval, i.e. the more intense DPCCH activity, the shorter preamble will suffice.

The two reduced operation modes basically target different transmission scenarios, where the more intense DPCCH activity supports frequent data transmissions with short intervals, and the less intense DPCCH activity supports applications with sporadic or large data volumes. For applications with periodic transmissions, such as Voice over Internet Protocol (VoIP) with Adaptive Multi-Rate (AMR) coding type, the further reduced operation mode is beneficial to use as much as possible. In the given example, voice frames are encoded and transmitted every 20 ms, while Silence Insertion Descriptor (SID) frames are transmitted every 160 ms during silence periods. This implies that, during silence periods, the UE enters the intense DPCCH activity mode every 160 ms and sends a burst of DPCCH frames before it returns to the less activity mode until next SID frame transmission. This not only increase interference; it also increases power consumption of the UE. It is therefore a desire to provide an improved gating approach.

SUMMARY

The present invention is based on the understanding that for applications with periodic data transmission, unnecessary DPCCH transmissions are made. The inventors have found that by observing data transmission history, a better decision on which reduced operation mode to use can be made.

According to a first aspect, there is provided a telecommunication apparatus enabled for high-speed packet access, the apparatus being arranged to operate according to a reduced and a further reduced mode of transmission of dedicated physical control channel transmission, and having an operation mode controller, wherein the operation mode controller is arranged to determine a number of present consecutive dedicated physical data channel transmissions, and if the number of present consecutive dedicated physical data channel transmissions reaches a threshold, set the operation mode to the reduced mode, or if the number of present consecutive dedicated physical data channel transmissions is below the threshold, set the operation mode to the further reduced mode.

The operation mode controller may according to an embodiment comprise a timer arranged to determine an interval for defining the number of expected consecutive dedicated physical data channel transmissions to reach the threshold; and a counter arranged to count the number of present dedicated physical data channel transmissions within the interval. The timer may according to an embodiment be arranged to start when a dedicated physical data channel transmission is present after an event without any dedicated physical data channel transmission. A counter value of the counter may according to an embodiment be reset when the timer starts and increments on each present dedicated physical data channel transmission such that the counter value is compared with the threshold for setting the operation mode when the timer expires. The event may according to an embodiment be an elapsed predetermined time period, or an occasion where the dedicated physical data channel transmission was not present at its expected time instant. The interval may according to an embodiment be a product of a factor n times a frame interval of a voice codec times the threshold.

Expected time instants for the dedicated physical data channel transmissions may, according to an embodiment, be according to a product of a factor n times a frame interval of a voice codec of the communication apparatus. The counter value may according to an embodiment increment on each present dedicated physical data channel transmission that occurs on the expected time instants for the dedicated physical data channel transmissions.

According to a second aspect, there is provided a method for a telecommunication apparatus enabled for high-speed packet access, the apparatus being arranged to operate according to a reduced and a further reduced mode of transmission of dedicated physical control channel transmission, the method comprising determining a number of present consecutive dedicated physical data channel transmissions, and if the number of present consecutive dedicated physical data channel transmissions reaches a threshold, setting the operation mode to the reduced mode, or if the number of present consecutive dedicated physical data channel transmissions is below the threshold, setting the operation mode to the further reduced mode.

The determining of present consecutive dedicated physical data channel transmissions may according to an embodiment comprise determining an interval for defining the number of expected consecutive dedicated physical data channel transmissions to reach the threshold. The determining of present consecutive dedicated physical channels may according to an embodiment further comprise starting a timer when a dedicated physical data channel transmission is present after an event without any dedicated physical data channel transmission; resetting counter value when the timer starts; and counting the number of present dedicated physical data channel transmissions within the interval by incrementing the counter value on each present dedicated physical data channel transmission. The setting of operation mode may according to an embodiment comprise comparing the counter value with the threshold when the timer expires for setting the operation mode. The event may according to an embodiment be an elapsed predetermined time period, or an occasion where the dedicated physical data channel transmission was not present at its expected time instant. The interval may according to an embodiment be a product of a factor n times a frame interval of a voice codec times the threshold.

Expected time instants for the dedicated physical data channel transmissions may, according to an embodiment, be according to a product of a factor n times a frame interval of a voice codec. The method may according to an embodiment further comprise incrementing the counter value on each present dedicated physical data channel transmission that occurs on the expected time instants for the dedicated physical data channel transmissions.

According to a third aspect, there is provided a computer program comprising computer program code comprising instructions to cause a processor on which the computer program code is executed to perform the method according to the second aspect.

An advantage of embodiments of the invention is that it enables staying in further reduced mode to a higher degree, which gives lower interference and less power consumption.

An advantage of embodiments of the invention is that a fairly simple way, in sense of performed operations, of determining proper operation mode is provided, which do not introduce complex calculations and power consuming computations.

DETAILED DESCRIPTION

Figure 1:
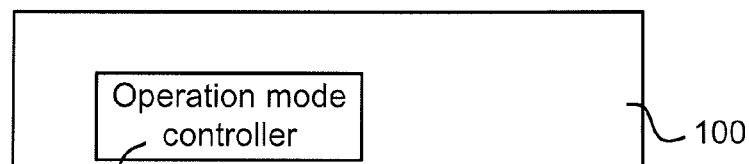
FIG. 1 is a block diagram schematically illustrating a telecommunication apparatus according to an embodiment.

FIG. 1 is a block diagram schematically illustrating a telecommunication apparatus 100 according to an embodiment. Not to obscure the features of the invention, inherent features of the telecommunication apparatus 100, such as antenna, transceiver, encoder, decoder, signal processor, possible user interface, etc., have been omitted in the illustration. The telecommunication apparatus 100 is for example a mobile phone, but may as well be a network node, a communication card in a personal computer, or other entity that operates in a communication system providing high-speed packet access. The telecommunication apparatus 100 is arranged to perform communication wirelessly, and arranged to operate according to both a reduced mode and a further reduced mode of transmission of dedicated physical control channel transmission, i.e. control information transmission, in addition to a normal mode of transmission of dedicated physical control channel transmission where dedicated physical control channel transmissions are performed in each slot. For selection among the operation modes of transmission of dedicated physical control channel transmission, an operation mode controller 102 is provided. The operation mode controller is arranged to determine a number of consecutive dedicated physical data channel transmissions, i.e. data transmission. This number of consecutive data transmissions is used as a measure of traffic history for determining efficient mode of operation. This is performed by observing if the number of consecutive dedicated physical data channel transmissions reaches a predetermined threshold. The threshold can for example be 3 consecutive dedicated physical data channel transmissions. If that is the case, the operation mode controller 102 sets the operation mode to the reduced mode, which is the reduced mode having more intense DPCCH activity having shorter intervals between DPCCH transmissions compared to the further reduced mode. If the number of consecutive data transmissions do not reach the threshold, the operation mode controller 102 sets the operation mode to the further reduced mode which is the reduced mode having less intense DPCCH activity having longer intervals between DPCCH transmissions compared to the reduced mode. Thereby, the telecommunication apparatus 100 does not enter the reduced mode unless a certain amount of continuous data traffic is present, and stays in the further reduced mode as much as possible. This gives lower interference and less power consumption.

Figure 2:
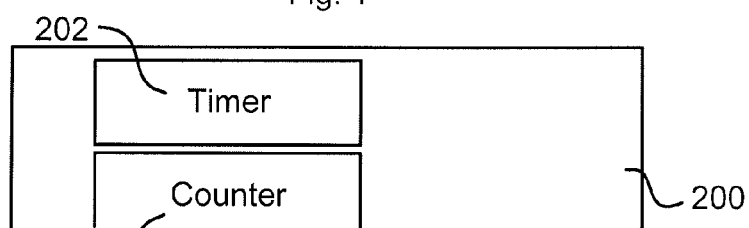
FIG. 2 is a block diagram schematically illustrating an operation mode controller according to an embodiment.

FIG. 2 is a block diagram schematically illustrating an operation mode controller 200 according to an embodiment. The operation mode controller 200 comprises a timer 202 and a counter 204. The timer 202 is arranged to determine an interval for defining the number of expected consecutive data transmissions for reaching the threshold. This interval can for example be the frame interval of the data transmission multiplied by the number of consecutive data transmissions for reaching the threshold, i.e. the frame interval times the threshold. The frame interval can for example be the frame interval of a voice codec of the communication apparatus. The interval can also be the frame interval multiplied with a factor n. Thus, the frame interval defines expected time instants for data transmissions. The timer 202 is started after an event without any data transmissions, e.g. when a first data transmission is present after a period where one or more data transmissions have not been present. The counter 204 is arranged to count the number of present data transmissions within the interval. Thus, the counter 204 is reset when the timer 202 is started and increments for each present data transmission during the interval when the timer 202 runs. When the interval of the timer 202 has elapsed, the value of the counter 204 is checked against the threshold, and if the counter value has reached the threshold, the reduced mode is set, otherwise the further reduced mode is set.

Figure 3:
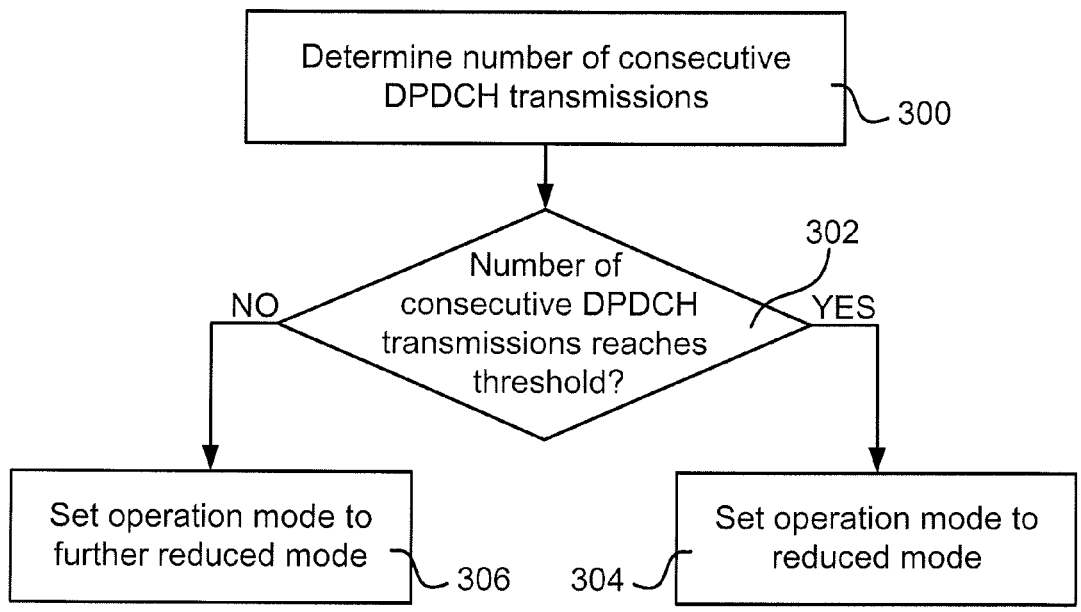
FIG. 3 is a flow chart schematically illustrating a method according to an embodiment.

FIG. 3 is a flow chart schematically illustrating a method according to an embodiment. In a data transmission determination step 300, the number of present consecutive data transmissions is determined. In a comparison step 302, the determined number of consecutive data transmissions is compared to a threshold to determine if the number of consecutive data transmissions reached the threshold. If it does, the operation mode is set to reduced mode in a reduced mode setting step 304. If not, the operation mode is set to further reduced mode in a further reduced mode setting step 306. It is to be noted that the flow chart is for illustrative purposes for the understanding of the principle of selection of operation mode. In practice, the method is preferably performed in a real-time fashion, where the procedure moves through different states depending on occurrences and available data, and where actions can be made in parallel.

Figure 4:
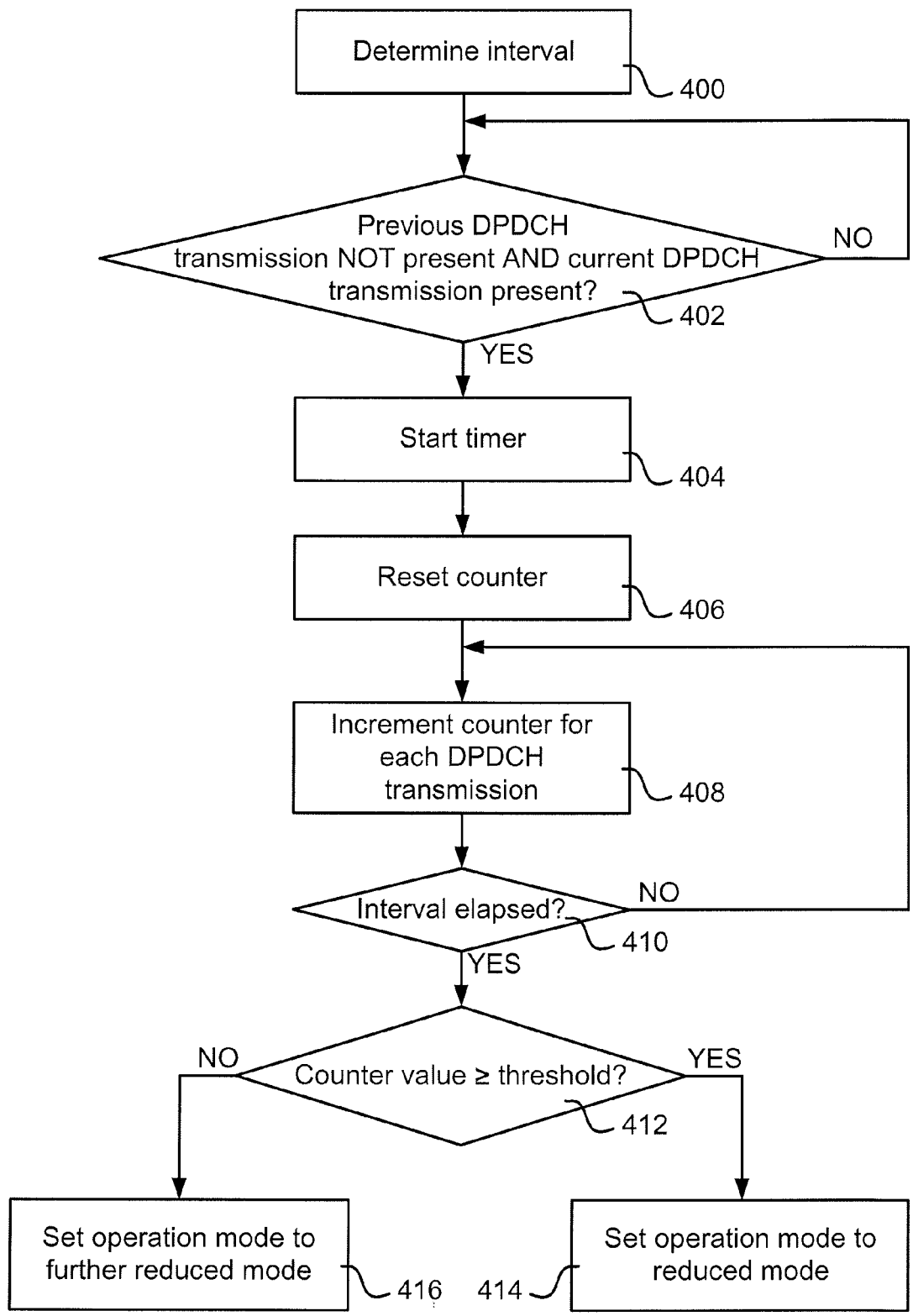
FIG. 4 is a flow chart schematically illustrating a method according to an embodiment.

FIG. 4 is a flow chart schematically illustrating a method according to an embodiment. In an interval determination step 400, a time interval is determined for defining the number of expected consecutive data transmissions to reach the threshold, as elucidated above. The time interval is to run from a first data transmission, after a period lacking data transmissions, to a time instant when an expected number of consecutive data transmissions have been present for reaching the threshold. Therefore, in a transmission checking step 402, it is checked whether there is a first data transmission, after a period lacking data transmissions. If not, the checking loops until such data transmission is present. If such data transmission is present, a timer is started in a timer starting step 404, and simultaneously, a counter is reset in a counter resetting step 406. During the interval, the counter is incremented in a counter increment step 408 for each present data transmission. In a time interval checking step 410, it is checked whether the time interval has elapsed. If not, the counter increment step 408 continues to check present data transmission and increments on presence. When the time of the interval has elapsed, it is checked in a counter checking step 412 if the counter value has reached the threshold. If it has, the operation mode is set to reduced mode in a reduced mode setting step 414. If not, the operation mode is set to a further reduced mode in a further reduced mode setting step 416. It is to be noted that the flow chart is for illustrative purposes for the understanding of the principle of selection of operation mode. In practice, the method is preferably performed in a real-time fashion, where the procedure moves through different states depending on occurrences and available data, and where actions can be made in parallel.

Figure 5:
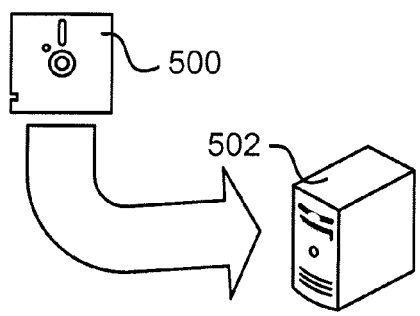
FIG. 5 schematically illustrates a computer readable medium according to an embodiment.

FIG. 5 schematically illustrates a computer readable medium 500 according to an embodiment. The embodiments of the methods elucidated above are suitable for implementation with aid of processing means, such as computers and/or processors, as the operation of modern telecommunication apparatuses highly rely on computerized signal processing. Therefore, there is provided computer programs, comprising instructions arranged to cause the processing means, processor, or computer to perform the steps of any of the methods according to any of the embodiments described with reference to any of FIG. 3 or 4, in a telecommunication apparatus. The computer programs preferably comprises program code which is stored on a computer readable medium 500, as illustrated in FIG. 5, which can be loaded and executed by a processing means, processor, or computer 502 to cause it to perform the methods, respectively, according to the embodiments, preferably as any of the embodiments described with reference to any of FIG. 3 or 4. The computer 502 and computer program product 500 can be arranged to execute the program code sequentially where actions of the any of the methods are performed stepwise, but mostly be arranged to execute the program code on a real-time basis where actions of any of the methods are performed upon need and availability of data. The processing means, processor, or computer 502 is preferably what normally is referred to as an embedded system. Thus, the depicted computer readable medium 500 and computer 502 in FIG. 5 should be construed to be for illustrative purposes only to provide understanding of the principle, and not to be construed as any direct illustration of the elements.

The invention claimed is:

1. A telecommunication apparatus enabled for high-speed packet access and comprising an operation mode controller, the operation mode controller comprising:
   a timer configured to determine an interval within which a threshold number of consecutive dedicated physical data channel transmissions are expected to occur,
   a counter configured to count the number of present dedicated physical data channel transmissions within that interval, and
   wherein the operation mode controller is configured to select between a normal mode, a reduced mode, and a further reduced mode of dedicated physical control channel transmission, by selecting the reduced mode if the number of present consecutive dedicated physical data channel transmissions within the interval reaches the threshold number, and selecting the further reduced mode if the number of present consecutive dedicated physical data channel transmissions within the interval is below the threshold number, wherein in normal mode dedicated physical control channel transmissions are performed in each of a plurality of time slots, and wherein in the reduced and further reduced mode the time interval between dedicated physical control channel transmissions are longer and even longer, respectively, than in the normal mode.

2. The telecommunication apparatus according to claim 1, wherein the timer is configured to start when a dedicated physical data channel transmission occurs after an event without any dedicated physical data channel transmission, and wherein the counter is configured to reset a counter value when the timer starts and to increment the counter value on each present dedicated physical data channel transmission, and wherein the operation mode controller is configured to set the operation mode by comparing the counter value with the threshold number when the timer expires.

3. The telecommunication apparatus according to claim 2, wherein the event is an elapsed predetermined time period.

4. The telecommunication apparatus according to claim 2, wherein the event is an occasion where a dedicated physical data channel transmission was not present at its expected time instant.

5. The telecommunication apparatus according to claim 1, wherein the interval is a product of a factor n times a frame interval of a voice codec times the threshold number.

6. The telecommunication apparatus according to claim 1, wherein expected time instants for the occurrence of dedicated physical data channel transmissions are defined according to a product of a factor n times a frame interval of a voice codec of the telecommunication apparatus.

7. The telecommunication apparatus according to claim 6, wherein the counter is configured to increment a counter value on each present dedicated physical data channel transmission that occurs on the corresponding expected time instant.

8. A method implemented by a telecommunication apparatus enabled for high-speed packet access, the method comprising
  determining an interval within which a threshold number of consecutive dedicated physical data channel transmissions are expected to occur;
  starting a timer when a dedicated physical data channel transmission is present after an event without any dedicated physical data channel transmission;
  resetting a counter value when the timer starts;
  counting the number of present dedicated physical data channel transmissions within said interval, by incrementing the counter value on each present dedicated physical data channel transmission, and
  selecting between a normal mode, a reduced mode, and a further reduced mode of dedicated physical control channel transmission, by selecting the reduced mode if the number of present consecutive dedicated physical data channel transmissions within the interval reaches the threshold number, and selecting the further reduced mode if the number of present consecutive dedicated physical data channel transmissions within the interval is below the threshold number, wherein in normal mode dedicated physical control channel transmissions are performed in each of a plurality of time slots, and wherein in the reduced and further reduced mode the time interval between dedicated physical control channel transmissions are longer and even longer, respectively, than in the normal mode.

9. The method according to claim 8, wherein said selecting comprises comparing the counter value with the threshold number when the timer expires.

10. The method according to claim 8, wherein the event is an elapsed predetermined time period.

11. The method according to claim 8, wherein the event is an occasion where a dedicated physical data channel transmission was not present at its expected time instant.

12. The method according to claim 8, wherein the interval is a product of a factor n times a frame interval of a voice codec times the threshold number.

13. The method according to claim 8, wherein expected time instants for the occurrence of dedicated physical data channel transmissions are defined according to a product of a factor n times a frame interval of a voice codec.

14. The method according to claim 13, further comprising incrementing the counter value on each present dedicated physical data channel transmission that occurs on the corresponding expected time instant.

15. A computer program product stored on a computer readable medium and comprising computer program code that, when executed on a processor of a telecommunication apparatus enabled for high-speed packet access, causes the telecommunication apparatus to:
  determine an interval within which a threshold number of consecutive dedicated physical data channel transmissions are expected to occur;
  start a timer when a dedicated physical data channel transmission is present after an event without any dedicated physical data channel transmission;
  reset a counter value when the timer starts;
  count the number of present dedicated physical data channel transmissions within said interval, by incrementing the counter value on each present dedicated physical data channel transmission, and
  select between a normal mode, a reduced mode, and a further reduced mode of dedicated physical control channel transmission, by selecting the reduced mode if the number of present consecutive dedicated physical data channel transmissions within the interval reaches the threshold number, and selecting the further reduced mode if the number of present consecutive dedicated physical data channel transmissions within the interval is below the threshold number, wherein in normal mode dedicated physical control channel transmissions are performed in each of a plurality of time slots, and wherein in the reduced and further reduced mode the time interval between dedicated physical control channel transmissions are longer and even longer, respectively, than in the normal mode.

* * * * *

UNITED STATES PATENT AND TRADEMARK OFFICE
CERTIFICATE OF CORRECTION

PATENT NO. : 8,442,068 B2  
APPLICATION NO. : 13/120478  
DATED : May 14, 2013  
INVENTOR(S) : Christoffersson et al.

Page 1 of 1

It is certified that error appears in the above-identified patent and that said Letters Patent is hereby corrected as shown below:

On the Title Page, in Item (75), under "Inventors", in Column 1, Line 1, delete "Lulea" and insert -- Luleå --, therefor.

On the Title Page, in Item (75), under "Inventors", in Column 1, Line 2, delete "Lulea (SE);" and insert -- Luleå (SE); --, therefor.

On the Title Page, in Item (75), under "Inventors", in Column 1, Line 2, after "Wang,", delete "Lulea" and insert -- Luleå --, therefor.

Signed and Sealed this  
Twenty-second Day of October, 2013

Teresa Stanek Rea  
*Deputy Director of the United States Patent and Trademark Office*